(12) United States Patent
Hisada et al.

(10) Patent No.: US 12,424,888 B2
(45) Date of Patent: Sep. 23, 2025

(54) ROTOR OF ROTARY ELECTRIC MACHINE

(71) Applicant: KABUSHIKI KAISHA TOSHIBA, Tokyo (JP)

(72) Inventors: Hideki Hisada, Kuwana Mie (JP); Hidenori Uchida, Mie Mie (JP); Hiroaki Makino, Fuchu Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 108 days.

(21) Appl. No.: 18/066,857

(22) Filed: Dec. 15, 2022

(65) Prior Publication Data

US 2023/0145591 A1    May 11, 2023

Related U.S. Application Data

(63) Continuation of application No. PCT/JP2021/040763, filed on Nov. 5, 2021.

(51) Int. Cl.
*H02K 1/276*    (2022.01)

(52) U.S. Cl.
CPC .................................. *H02K 1/2766* (2013.01)

(58) Field of Classification Search
CPC .................................................... H02K 1/2766
USPC ..................................................... 310/156.53
See application file for complete search history.

(56) References Cited

U.S. PATENT DOCUMENTS 11,581,766 B2 *   2/2023   Yim .................... F04C 18/0215
11,735,967 B2 *   8/2023   Jourdan ............... H02K 1/2781
                                                        310/156.21
12,021,414 B2 *   6/2024   Xu ......................... H02K 1/276
2007/0052313 A1   3/2007   Takahashi et al.
2011/0273049 A1   11/2011  Palfai et al.
2015/0236555 A1   8/2015   Takeda et al.
(Continued)

FOREIGN PATENT DOCUMENTS

EP    2 980 962 B1    4/2020
JP    2004-104962 A   4/2004
(Continued)

OTHER PUBLICATIONS

Japan Patent Office, International Search Report in International Application No. PCT/JP2021/040763 (Dec. 21, 2021), 2 pages, and machine translation, 2 pages.
(Continued)

*Primary Examiner* — Forrest M Phillips
(74) *Attorney, Agent, or Firm* — Finnegan, Henderson, Farabow, Garrett & Dunner, LLP

(57) ABSTRACT

According to one embodiment, a rotor includes a rotor core including magnetic poles arranged in a circumferential direction around a central axis, each magnetic pole including magnet holder slots each of which includes an opening end opened to an outer circumference of the rotor core, a first core portion between adjacent magnet holder slots, a second core portion between the magnet holder slots and the central axis, and a bridge connecting the first core portion and the second core portion, permanent magnets within the respective magnet holder slots, and a non-magnetic filling material filled into a cavity between the permanent magnet and the opening end in the magnet holder slot and joined to the permanent magnet and an inner wall of the magnet holder slot.

7 Claims, 3 Drawing Sheets

(56) References Cited

U.S. PATENT DOCUMENTS

| | | |
|---|---|---|
| 2020/0021153 A1 | 1/2020 | Saito et al. |
| 2023/0145591 A1* | 5/2023 | Hisada ................. H02K 1/2766 |
| | | 310/156.53 |
| 2023/0198324 A1* | 6/2023 | Saito .................... H02K 1/2766 |
| | | 310/156.53 |

FOREIGN PATENT DOCUMENTS

| | | |
|---|---|---|
| JP | 2013-99048 A | 5/2013 |
| JP | 2014-50208 A | 3/2014 |
| JP | 2014-155357 A | 8/2014 |
| JP | 5851365 B2 | 2/2016 |
| JP | 2018-85819 A | 5/2018 |
| JP | 2020-10466 A | 1/2020 |
| WO | WO 2018/131393 A1 | 7/2018 |

OTHER PUBLICATIONS

European Patent Office, Extended European Search Report in EP App. No. 21944427.0 (May 20, 2025).

* cited by examiner

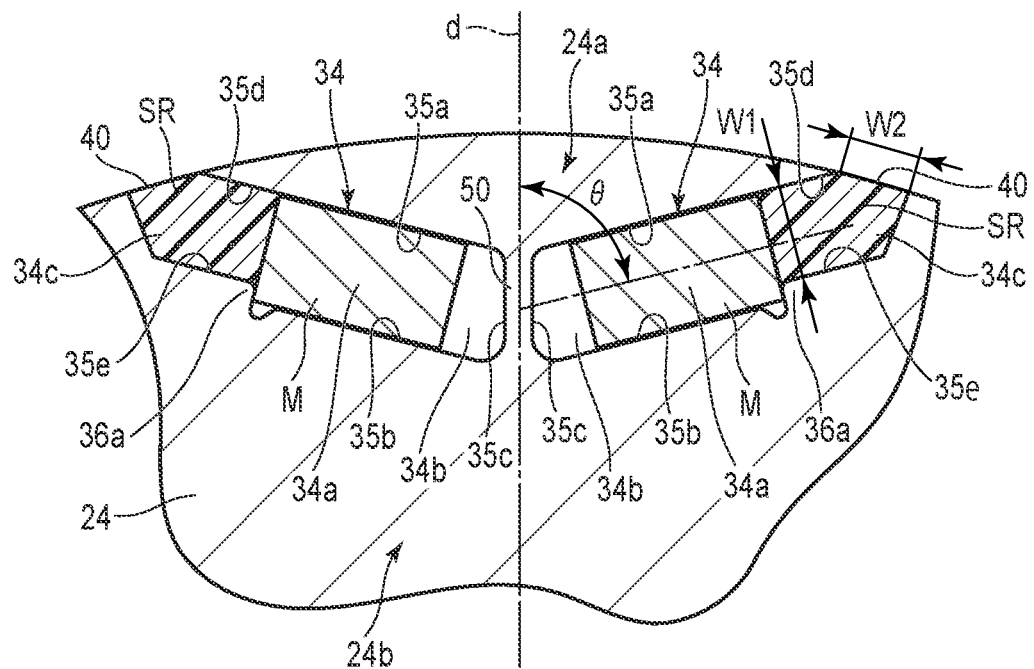
F I G. 2
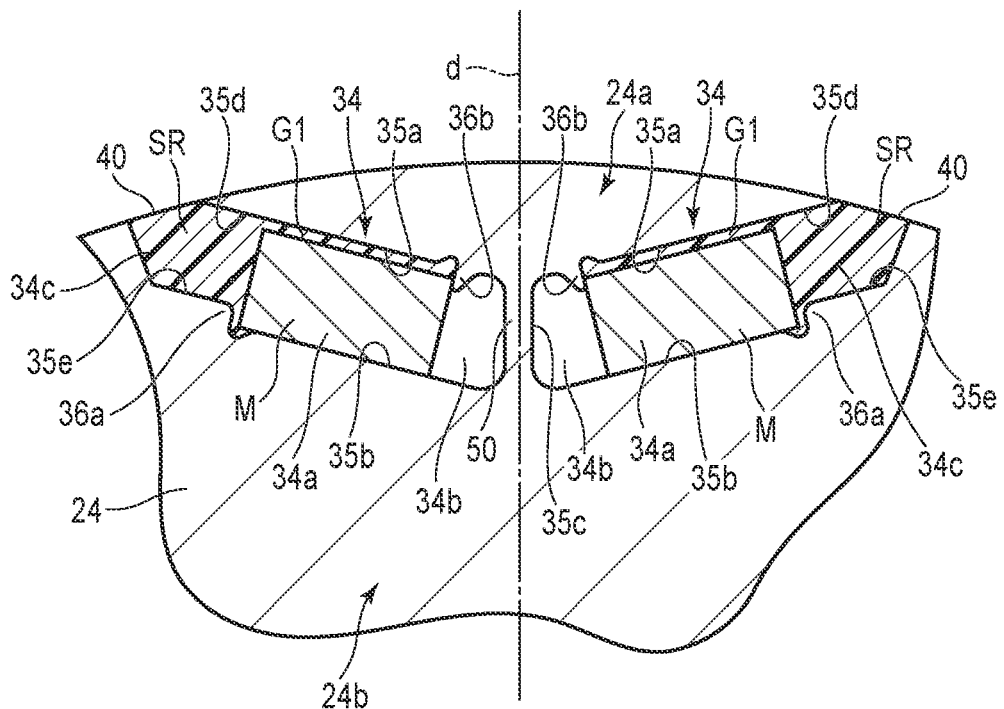
F I G. 3

ROTOR OF ROTARY ELECTRIC MACHINE

CROSS-REFERENCE TO RELATED APPLICATIONS

This application is a Continuation Application of PCT Application No. PCT/JP2021/040763, filed Nov. 5, 2021, the entire contents of which are incorporated herein by reference.

FIELD

Embodiments described herein relate generally to a rotor of a rotary electric machine including a permanent magnet.

BACKGROUND

Permanent magnet-type rotary electric machine comprise a cylindrical stator and a circular columnar rotor rotatably supported inside the stator. The rotor comprises a rotor core and a plurality of permanent magnets embedded in the rotor core.

As such a permanent magnet-type rotary electric machine, a rotary electric machine having a configuration in which two magnets are arranged in a V-shape per pole and a magnet slot which contain the magnets is open to the surface of the rotor core has been proposed. In a rotary electric machine having the above-described configuration, leakage of magnetic flux of the magnets in the bridge of the rotor core can be reduced and the magnet torque generated per magnet weight can be increased. Or, it is possible to reduce the magnet weight while maintaining the torque of the rotary electric machine.

However, with this configuration, under conditions where large torque is generated, electromagnetic force in the circumferential direction is applied to the core portion located on an inner side of magnets arranged into a V-shape, which causes strong bending stress to the bridge located near the center of the magnetic poles. This may result in insufficient strength of the bridge. Or, if the bridge is made thicker for stress resistance, the leakage of magnetic flux increases, making it difficult to reduce the magnet weight.

BRIEF DESCRIPTION OF THE DRAWINGS

FIG. 2 is a partially enlarged lateral cross-sectional view of the rotor of the rotary electric machine.

FIG. 3 is a partially enlarged lateral cross-sectional view of a rotor of a rotor electric machine according to the second embodiment.

DETAILED DESCRIPTION

Figure 1:
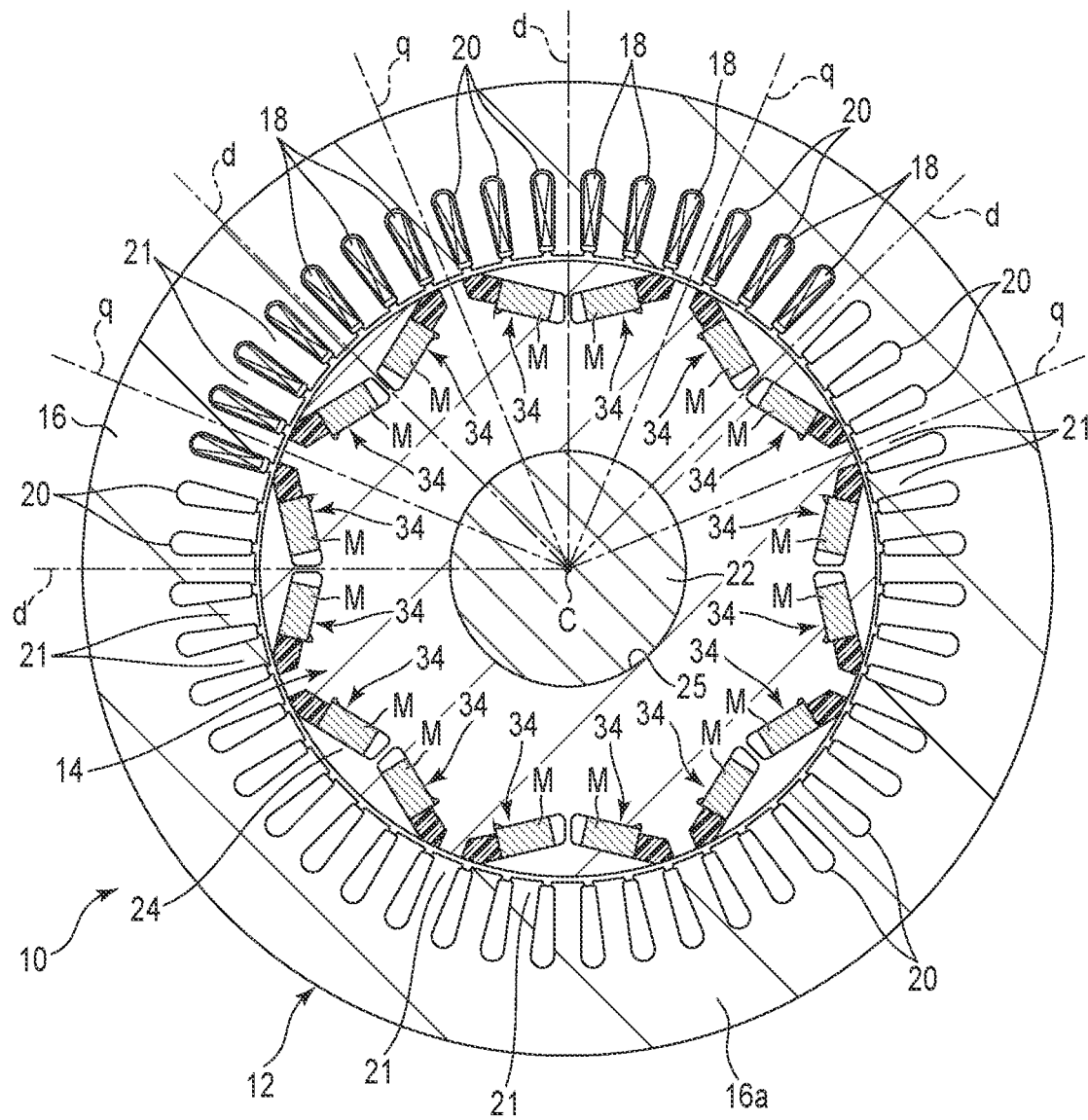
FIG. 1 is a lateral cross-sectional view of a permanent magnet-type rotary electric machine according to the first embodiment.

Embodiments will be described hereinafter with reference to the accompanying drawings.

In general, according to one embodiment, a rotor of a rotary electric machine comprises a rotor core including a plurality of magnetic poles arranged in a circumferential direction around a central axis, each of the magnetic poles including a plurality of magnet holder slots which are arranged to be spaced apart from each other in the circumferential direction and each of which includes an opening end opened to an outer circumference of the rotor core, and a closed end, a first core portion located between adjacent magnet holder slots of the plurality of magnet holder slots in the circumferential direction, a second core portion located between the magnet holder slots and the central axis, and a bridge connecting the first core portion and the second core portion; a plurality of permanent magnets disposed within the respective magnet holder slots; and a non-magnetic filling material filled into a cavity between the permanent magnet and the opening end in the magnet holder slot and joined to the permanent magnet and an inner wall of the respective magnet holder slot.

Throughout the embodiments, common elements are denoted by like reference numerals, and a detailed description thereof may be omitted unless otherwise necessary. Further, in order to make the description clearer, the widths, thicknesses, shapes, etc., of the respective parts are schematically illustrated in the drawings, compared to the actual modes. These parts can be redesigned or remodeled as needed with reference to the following descriptions and the conventional techniques.

First Embodiment

FIG. 1 is a lateral cross-sectional view of a permanent magnet-type rotary electric machine according to the first embodiment, and FIG. 2 is an enlarged lateral cross-sectional view of one polar part of the rotor.

As shown in FIG. 1, a rotary electric machine 10 is configured, for example, as an inner rotor-type rotary electric machine. The rotary electric machine 10 comprises an annular or cylindrical stator 12 supported by a fixed frame not shown in the figure, and a rotator 14 supported freely rotatable around a central axis C inside the stator, which is coaxial with the stator 12. The rotary electric machine 10 can be suitably applied, for example, to a drive motor or a generator in, for example, hybrid electric vehicles (HEV) and electric vehicles (EV).

The stator 12 comprises a cylindrical stator core 16 and an armature wound wire (coil) 18 wound around the stator core 16. The stator core 16 is constituted by stacking a number of annular electromagnetic steel plates (core pieces) of a magnetic material, for example, silicon steel or the like, one on another in a concentric manner. In the inner circumferential portion of the stator core 16, a plurality of slots 20 are formed. The slots 20 are arranged to be spaced apart from each other at equal intervals along the circumferential direction. Each of the slots 20 is open to an inner circumferential surface of the stator core 16 and extends from the inner circumferential surface in a radial direction. Each slot 20 extends over the entire axial length of the stator core 16. With the plurality of slots 20 thus formed, an outer circumferential portion of the stator core 16 constitutes a circular yoke portion 16a and an inner circumferential portion of the stator core 16 constitutes a plurality (for example, 48 in this embodiment) of stator teeth 21 opposing the rotor 14. The stator teeth 21 extend from the yoke portion 16a toward the central axis C in the radial direction. The armature wound wire 18 is inserted into the slots 20 and wound around each of the stator teeth 21. When current is allowed to flow through the armature wound wire 18, a predetermined chain flux is formed in the stator 12 (the stator teeth 21).

The rotor 14 includes a circular columnar shaft (rotation shaft) 22, both ends of which are rotatably supported by bearings not shown in the figure, a cylindrical rotor core 24 fixed at an axial central portion of the shaft 22, and a plurality of permanent magnets M embedded in the rotor core 24. The rotor 14 is coaxially arranged inside the stator 12 with a small gap (air gap) therebetween. That is, the outer circumferential surface of the rotor 14 opposes the inner circumferential surface of the stator 12 with a slight gap therebetween. The rotor core 24 includes an inner hole 25 formed coaxially with the central axis C. The shaft 22 is inserted and fitted into the inner hole 25 and extends coaxially with the rotor core 24. The rotor core 24 is constructed by stacking a number of magnetic plates, for example, circular electromagnetic steel plates (core pieces) such as silicon steel, into a multiplayer body stacked in a concentric manner. The rotor core 24 has the central axis C extending in the stacking direction of the core pieces and an outer circumferential surface coaxial with the central axis C.

In this embodiment, the rotor 14 includes a plurality of magnetic poles, for example, eight magnetic poles, arranged in a circumferential direction around the central axis C. In the rotor core 24, the axis extending in the radial direction of the rotor core 24 and passing through the central axis line C and the boundary between a respective pair of magnetic poles adjacent to each other is referred to as a q-axis, and the axis electrically separated by 90 degrees in the circumferential direction from the q-axis, that is, the axis passing through the center of the magnetic pole and the central axis C, is referred to as a d-axis. The direction in which the chain flux formed by the stator 12 can easily flow is the q-axis. The d-axes and q-axes are alternately provided in the circumferential direction of the rotor core 24 and in predetermined phases. One magnetic polar portion of the rotor core 24 refers to an area between two adjacent q-axes in the circumferential direction (⅛ circumferential angular area). Thus, the rotor core 24 is constituted by eight poles (magnetic poles). The circumferential center of one pole is referred to as the d-axis.

As shown in FIGS. 1 and 2, in the rotor core 24, a plurality of permanent magnets, for example, two permanent magnets M are embedded per one magnetic pole. In the circumferential direction of the rotor core 24, magnet holder slots(, which may be, in some cases, referred to as magnet holding cavities or magnet embedding holes) 34 for loading the permanent magnets M are formed respectively on both sides of each d-axis. The two permanent magnets M are each loaded and disposed in each of the magnet holder slots 34 and secured to the rotor core 24 by, for example, adhesive.

As shown in FIG. 2, each magnet holder slot 34 is formed to penetrate the rotor core 24 in the axial direction. When viewed in a cross-sectional plane orthogonal to the central axis C of the rotor core 24, the two magnet holder slots 34 are formed and arranged linearly symmetrical about the respective d-axis, and they are aligned in an approximately V-shaped arrangement, for example. Each magnet holder slot 34 includes an opening end which is opened or released to the outer circumference of the rotor core 24 and a closed end (the other end) that is located near the d-axis and closed.

Each magnet holder slot 34, which functions as a flux barrier, includes a rectangular magnet loading area 34a corresponding to the cross-sectional shape of the permanent magnet M, an inner peripheral side cavity 34b extending from an inner peripheral end of the magnet loading area 34a, and an outer peripheral side cavity 34c extending from an outer peripheral end of the magnet loading area 34a and open to the outer circumference of the rotor core 24. The outer peripheral side cavity 34c extends from the magnet loading area 34a to the opening end (opening 40) of the slot. The rotor core 24 includes a holder projection (step) 36a protruding in the outer peripheral side of the magnet loading area 34a from the inner edge 35b of the magnet holder slot 34 into the magnet holder slot 34.

The magnet loading area 34a is formed between a flat inner edge (inner peripheral long edge) 35b and a flat outer edge (outer peripheral long edge) 35a, which oppose parallel to each other with an interval to the inner edge 35b. The inner edge 35b and the outer edge 35a extend and are inclined at an angle θ less than 90 degrees with respect to the d-axis. That is, the magnet loading area 34a is provided to gradually increase the distance from the d-axis from the inner circumferential edge to the outer circumferential edge, and gradually shorten the distance from the outer circumferential surface of the rotor core 24 from the inner circumferential edge to the outer circumferential edge, so as to be inclined. The angle θ is not limited to that of the example shown in the figure, but can be changed as desired.

The inner peripheral side cavity 34b extends from the inner circumferential end (d-axis end) of the magnet loading area 34a toward the d axis. The inner peripheral side cavity 34d is defined by an outer edge connected to be flush with the outer edge 35b of the magnet loading area 34a, an inner edge connected to be flush with the inner edge 35b of the magnet loading area 34a, and an end edge 35c extending approximately parallel to the d-axis and connected to the outer edge and the inner edge. End edge 35c constitutes the closed end of the slot. The end edge 35c constitutes a closed end of the slot. The end edge 35c opposes approximately parallel to the d-axis with an interval therebetween.

The outer peripheral side cavity 34c extends from the outer circumferential end of the magnet loading area 34a (the end of the rotor core on the outer circumferential surface) toward the outer circumferential surface of the rotor core 24 and is open or released to the outer circumference of the rotor core 24. The outer peripheral side cavity 34c is defined between an outer edge 35d extending from one end of the outer edge 35a of the magnet loading area 34a to the outer circumference of the rotor core 24 so as to be flush with the outer edge 35a, and one end of the inner edge 35b of the magnet loading area 34a, that is, in this case, an inner edge 35e extending approximately parallel to the outer edge 35a from a projecting end of the holder projection 36a to the outer circumference of the rotor core 24. The inner edge 35e is one step higher than the inner edge 35b by the height of the holder projection 36a, that is, in other words, closer to the side of the outer edge 35d, and extending from the projecting end of the holder projection 36a so as to be approximately parallel to the outer edge 35d. Further, the inner edge 35e bends toward the side of the outer edge 35d in the middle and then extends to the outer circumference of the rotor core 24. With this configuration, in the outer peripheral side cavity 34c, the area on the side of the magnet loading area 34a has a width W1 (the interval between the outer edge 35d and the inner edge 35e), whereas the opening 40 has a circumferential width W2 which is less than the width W1. Note that the opening 40 is open over the entire axial length of the rotor core 24 to have the above-mentioned width.

Note that the outer edges 35a and 35d and the inner edges 35b and 35e of the magnet holder slot 34 are equivalent to the inner wall of the magnet holder slot 34.

The inner peripheral side cavity 34b and the outer peripheral side cavity 34c of the magnet holder slot 34 function as magnetic cavities (flux barriers) which suppress leakage of magnetic flux from both longitudinal ends of the permanent magnet M to the rotor core 24, and further contribute to weight reduction of the rotor core 24.

The permanent magnets M are each formed, for example, into a slender flat plate with a rectangular cross-section, which has a length approximately equal to the axial length of the rotor core 24. Each permanent magnet M is embedded over the entire axial length of the rotor core 24. The permanent magnet M may be configured as a combination of magnets segmented along the axial (longitudinal) direction, in which case these magnets are formed to have a total length which is approximately equal to the axial length of the rotor core 24.

As shown in FIG. 2, each permanent magnet M has a rectangular cross-sectional shape, which has a pair of long sides opposing parallel to each other and a pair of short sides opposing each other. The cross-sectional shape of the permanent magnet M is not limited to a rectangular shape (quadrangle), but may be a parallelogram.

The permanent magnet M is loaded into the respective magnet loading area 34a of the magnet holder slot 34, in such a manner that one long side thereof is located to oppose and adjacent to or in contact with the outer edge 35a and the other long side is located to oppose and adjacent to or in contact with the outer edge 35b. One short side of the permanent magnet M, that is, one end portion of the short side on the outer circumferential side, is brought into contact with the holder projection 36a. With this arrangement, the permanent magnet M is held in the magnet loading area 34a in a state in which the longitudinal position is aligned. The permanent magnets M may be fixed to the rotor core 24 by adhesive or the like. The two permanent magnets M located on respective sides of the d-axis are arranged into an approximately V-shape. That is, the two permanent magnets M are arranged to incline so that the distance from the d-axis gradually increases from the inner circumferential end to the outer circumferential end and the distance from the outer circumferential surface of the rotor core 24 gradually shortens from the inner circumferential end to the outer circumferential end.

Each permanent magnet M is magnetized in the direction perpendicular to the long side. The two permanent magnets M located on respective circumferential sides of the d-axis, that is, two permanent magnets which constitute one magnetic pole, are arranged so that the magnetization directions thereof are identical to each other. On the other hand, two permanent magnets M located on respective circumferential sides of each q-axis are arranged so that the magnetization directions thereof are opposite to each other. In this embodiment, the rotating electric motor 10 constitutes a permanent magnets-embedded type rotary electric machine with eight polar (four pole pairs) in which permanent magnets M are arranged so that front and back sides of the N and S poles thereof alternate from each one pole to adjacent one.

As shown in FIG. 2, the rotor core 24 comprises, in each pole, a fan-shaped outer circumferential area (a first core portion) 24a located between the two magnet holder slots 34, an inner circumferential area 24b of the rotor core 24 (an area between the magnet holder slots 34 and inner hole 25 (shaft 22), that is (a second core portion)), and a columnar bridge 50 which connects the first core portion 24a and the second core portion 24b. The bridge 50 is formed between the two inner peripheral side cavities 34b of the two magnet holder slots 34 of the two magnet holder slots 34 and extends along the d-axis. The number of bridge 50 is not limited to one, but a plurality of bridges may be provided.

The outer peripheral side cavity 34c of each magnet holder slot 34 is filled with a non-magnetic filling material SR. The filler material SR is joined or adhered to the short sides of the permanent magnet M, the outer edge 35d and the inner edge 35e of the outer peripheral side cavity 34c, and further blocks the opening 40. In the opening 40, the filler material SR is located to be substantially flush with the outer circumferential surface of the fixed core 24 and thus forms a part of the outer circumferential surface.

The filling material SR which fills the outer peripheral side cavity 34c is a low permeability material which has a magnetic permeability lower than that of the magnetic plate which forms the rotor core 24, and a usable example thereof is resin. Apart from resin, the filler material SR may be a metal such as aluminum, stainless steel or the like, or carbon fiber-reinforced plastic.

FIG. 2 shows an example in which the entire outer peripheral side cavity 34c is filled with the filler material SR, but the configuration it is not limited to this. Note that it suffices if the filling material SR is applied by such an amount that at least the short sides of the permanent magnet M, part of the outer edge 35d of the outer peripheral side cavity 34c, and part of the inner edge 3 are joined. Further, the filling material SR may be applied to fill the inner peripheral side cavity 34b as well.

According to the rotor 14 of the rotary electric machine 10 according the first embodiment configured as described above, one end of the magnet holder slot is open to the outer circumference of the rotor core 24, and with this configuration, the leakage flux of the permanent magnets can be reduced and the magnet torque generated per magnet weight can be increased. At the same time, with the configuration in which the outer peripheral side cavity 34c of the magnet holder slot is filled with the filler material SR such as resin, the filler material SR serves to suppresses the deformation of the magnetic plates which constitute the rotor core 24 and the deformation of the bridge 50, thus making it possible to improve the strength of the rotor core 24 and the strength of the bridge 50. Therefore, even when circumferential electromagnetic forces are applied to the outer circumferential area 24a of the rotor core 24 under conditions where large torque is generated, the deformation of the magnetic plates and bridge can be suppressed, and the outer circumferential area 24a of the rotor core 24 can be stably supported. In addition, it is possible to make the bridge 50 thinner.

As described above, according to the first embodiment, it is possible to improve the torque and output of a rotary electric machine of the same size, or to reduce the size and weight of the rotary electric machine while maintaining the same output. Furthermore, the cost of the rotor can be lowered by reducing the weight of the magnets used.

Next, rotors of rotary electric machines according to other embodiments of this invention will be described. In the other embodiments described below, parts identical to the above-described first embodiment will be designated by the same reference symbols, and their detailed descriptions will be omitted or simplified. The parts that differ from those of the first embodiment will be mainly described in detail.

Second Embodiment

FIG. 3 is a lateral cross-sectional view of a part of the rotor of the rotary electric machine according to the second embodiment.

As shown in the figure, according to the second embodiment, in the rotor core 24, the magnet loading area 3 of the magnet holder slot 34 is formed to have a width 34a (the distance between the outer edge 35a and the inner edge 35b), which is greater than the width (thickness) of the permanent magnets M. With this configuration, a gap (first gap) G1 of about several millimeters is formed between the outer edge 35a and the outer long side of the respective permanent magnet M. The gap G1 includes one end connected to the outer peripheral side cavity 34c and the other end adjacent to the inner peripheral side cavity 34b.

The rotor core 24 has a holder projection (the first projection) protruding into the inner peripheral side cavity 34b from the inner circumferential end of the outer edge 35a. The holder projection 36b abuts on an end portion of the short side of the permanent magnet M to align the permanent magnet M, and also functions as a leakage stopper which seals the other end of the inner circumference side of the gap G1.

The non-magnetic filling material SR is filled into the outer peripheral side cavity 34c and further into the gap G1. The filler material SR which fills the gap G1 is joined to the long side portion of the permanent magnet M and the outer edge 35a of the magnet loading area 34a. The filling material SR is restricted from leaking to the side of the inner peripheral side cavity 34b by the holder projection 36b.

In the second embodiment, the other configuration of the rotor is similar to that of the rotor in the first embodiment described above.

According to the second embodiment having the above-described configuration, the width (thickness) of the permanent magnets M is set less than the width of the magnet holder slot 34, and therefore each permanent magnet M can be easily inserted into and set in the magnet holder slot 34 when the rotor is assembled. Then, the gap G1 between the permanent magnet M and the magnet holder slot 34 is filled with the filling material SR, and thus the permanent magnet M can be held without rattling. Variations in the machining accuracy of the electromagnetic steel plates which constitute the rotor core 24 can be absorbed by the filler material SR, and adverse effects on the permanent magnets M can be suppressed. Further, with the projecting portion 36b provided for stopping leakage, the leakage of the filler material SR can be prevented and the filler material SR can be filled and held at the desired location. The other advantageous effects similar to those of the first embodiment described above can be obtained as well in the second embodiment.

Third Embodiment

Figure 4:
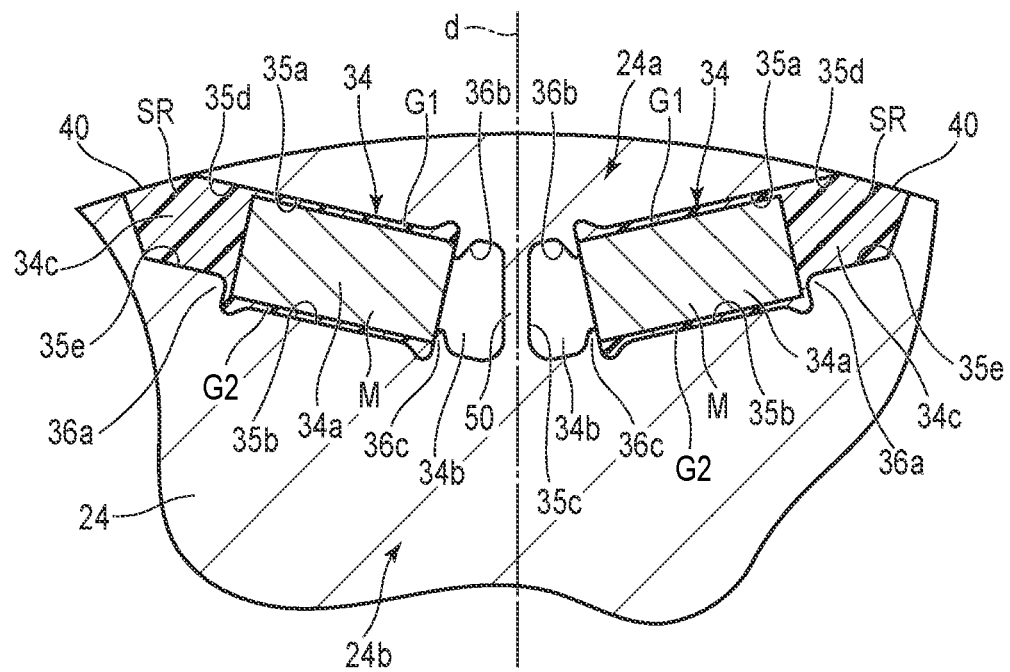
FIG. 4 is a partially enlarged lateral cross-sectional view of a rotor of a rotor electric machine according to the third embodiment.

FIG. 4 is a lateral cross-sectional view of a part of the rotor of the rotary electric machine according to the third embodiment.

As shown in the figure, according to the third embodiment, in the rotor core 24, the width (thickness) of the permanent magnets M is set further less than the width of the magnet loading area 34a(, that is, the distance between the outer edge 35a and the inner edge 35b). Thus, a gap G1 of several millimeters (mm) is created between the outer edge 35a and the outer long side of the permanent magnet M, and a gap (second gap) G2 of several millimeters (mm) is created between the outer edge 35a on the opposite side and the inner long side of the permanent magnet M. The gap G2 includes one end connected to the outer peripheral side cavity 34c and the other end adjacent to the inner peripheral side cavity 34b.

The rotor core 24 includes, in addition to the holder projection (first projecting portion) 36b protruding from the inner circumferential end of the outer edge 35a into the inner circumferential gap 34b, a holder projection (second projecting portion) 36c protruding from the inner circumferential end of the inner edge 35b into the inner peripheral side cavity 34b. The holder projections 36b and 36c each abut to the short side of the permanent magnet M to align the permanent magnet M and further function as a leak stopper which seals the other inner circumferential ends of the gaps G1 and G2. Respective ends of the gaps G1 and G2, that is, the outer circumferential ends thereof, are each connected to the outer peripheral side cavity 34c.

The non-magnetic filler material SR is filled into the outer peripheral side cavity 34c and further into the gaps G1 and G2. The filler material SR which fills the gap G1 is joined to the long side portion of the permanent magnet M and the outer edge 35a of the magnet loading area 34a. The filler material SR which fills the gap G2 is joined to the long side portion of the permanent magnet M and the inner edge 35b of the magnet loading area 34a. The filler material SR is restricted from leaking to the side of the inner peripheral side cavity 34b by the holder projections 36b and 36c.

In the third embodiment, the other configurations of the rotor is similar to those of the rotor in the first embodiment described above.

In the third embodiment of the above-described configuration as well, advantageous effects similar to those of the second embodiment and the first embodiment, described above, can be obtained.

Fourth Embodiment

Figure 5:
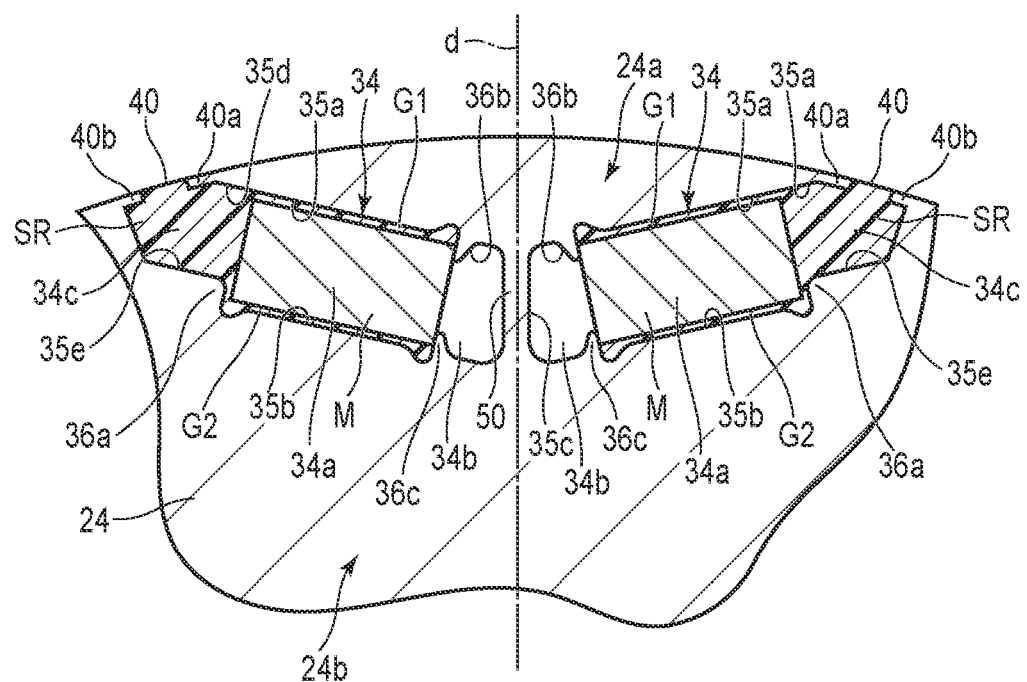
FIG. 5 is a partially enlarged lateral cross-sectional view of a rotor of a rotor electric machine according to the fourth embodiment.

FIG. 5 is a lateral cross-sectional view of a part of the rotor of the rotary electric machine according to the fourth embodiment.

As shown in the figure, according to the fourth embodiment, the rotor core 24 includes at least one projecting portion protruding into the opening 40 of the magnet holder slot 34. In this embodiment, the stator core 24 includes a pair of projecting portions 40a and 40b protruding into the opening 40 from respective circumferential sides of the opening 40. Thus, the opening 40 is partially blocked by the pair of projecting portions 40a and 40b, the opening 40 formed between the projecting portions 40a and 40b has a width sufficiently less as compared the width of the outer peripheral side cavity 34c and the width of the magnet loading area 34c, that is, for example, about ⅓ of the width.

The outer edge 35d of the outer peripheral side cavity 34a extends from the outer edge 35a of the magnet loading area 34a to be flush with the outer edge 35a, and then bends toward the opening 40 near the outer circumference of the rotor core 24. It further extends in the circumferential direction along the projecting portion 40a, and bends at a right angle toward the outer circumferential surface to extend thereto. The inner edge 35e of the outer peripheral side cavity 34c extends from the protruding end of the holder projection 36 substantially parallel to the outer edge 35d, and bends, in the middle, toward the side of the outer edge 35d. Then, it bends toward the opening 40 near the outer circumference of the rotor core 24, and extends in the circumferential direction along the projecting portion 40b. Further, it bends at right angles to the side of the outer circumferential surface to extend thereto.

As described, the pair of projecting portions 40a and 40b reduce the width of the opening 40 and further form a pair of shoulder portions or stopper portions extending in the circumferential direction in the vicinity of the opening 40. The non-magnetic filler material RS is filled into the outer peripheral side cavity 34c and the gaps G1 and G2. In the outer peripheral side cavity 34c, the filler material RS is joined to the short side of the permanent magnet M, the outer edge 35d including the shoulder portion (projecting portion 40a), and the inner edge 35e including the shoulder portion (projecting portion 40b).

In the fourth embodiment, the other configurations of the rotor are similar to those of the rotor of the third embodiment described above.

According to the fourth embodiment with the above-described configuration, with the projecting portions (shoulder portions) 40a and 40b provided near the opening 40, the filling material RS can be prevented from being extracted or popped out therefrom, and thus the filling material RS can be held securely in the outer peripheral side cavity 34c.

Usually, as the filler material (resin) and the rotor core 24, which have linear expansion coefficients different from each other undergo repeated temperature changes, delamination occurs at the interface between the filler material and the rotor core, and repeated centrifugal force can cause the resin to crack and pop out to the outer circumferential side, which may interfere with the rotation.

In contrast, according to this embodiment, the projecting portions 40a and 40b or shoulder portions can reliably prevent popping out of the filler material and improve reliability. In addition, in the fourth embodiment as well, advantageous effects similar to those of the second embodiment and the first embodiment, described above, can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of poles, dimensions, shape, etc., of the rotor are not limited to those of the embodiments described above, but can be changed in various ways depending on the design. The number of permanent magnets installed in each pole of the rotor is not limited to two, but can be increased as needed. The filler material is not limited to those listed in the embodiments, but can be selected from a variety of other filler materials.

What is claimed is:

1. A rotor of a rotary electric machine comprising:
    a rotor core including a plurality of magnetic poles arranged in a circumferential direction around a central axis, each of the magnetic poles including:
        a plurality of magnet holder slots which are arranged to be spaced apart from each other in the circumferential direction and each of which includes an opening end opened to an outer circumference of the rotor core, a closed end, a magnet loading area, an inner peripheral side cavity defined between an inner peripheral end of the magnet loading area and the closed end, and an outer peripheral side cavity extending from an outer peripheral end of the magnet loading area to the opening end,
        a first core portion located between adjacent magnet holder slots of the plurality of magnet holder slots in the circumferential direction,
        a second core portion located between the plurality of magnet holder slots and the central axis, and
        a bridge connecting the first core portion and the respective second core portion;
    a plurality of permanent magnets disposed within the magnet loading area of the respective magnet holder slots; and
    a non-magnetic filling material filled into a cavity the outer peripheral side cavity between the permanent magnet and the opening end in the magnet holder slot and into a first gap between the permanent magnet and an inner surface of the magnet holder slot, and joined to the permanent magnet and the inner surface of the magnet holder slot,
    wherein
        the first gap includes one end connected to the outer peripheral side cavity and the other end located on a side of the inner peripheral side cavity, and
        the rotor core includes a first projection protruding into the magnet holder slot from the inner wall of the magnet holder slot and sealing the other end of the first gap.

2. The rotor of the rotary electric machine of claim 1, wherein
    the magnet holder slots are each formed between an outer edge and an inner edge opposing the outer edge with an interval therebetween, and a width of the opening end in the circumferential direction is less than the interval.

3. The rotor of the rotary electric machine of claim 2, wherein
    the permanent magnets have a width less than the interval and larger than the width of the opening end, and
    the first gap is defined between the respective permanent magnet and the outer edge, and the filling material filled into the first gap is joined to the permanent magnet and the outer edge.

4. The rotor core of the rotary electric machine of claim 3, wherein
    the first projection protrudes from the outer edge into the respective magnet holder slot and seals the other end of the first gap.

5. The rotor of the rotary electric machine of claim 3, wherein
    a second gap is defined between the respective permanent magnet and the inner edge, and the filler material is filled into the second gap and joined to the permanent magnet and the inner edge.

6. The rotor core of the rotary electric machine of claim 5, wherein
    the second gap includes one end located on the side of the opening end and communicating with the outer peripheral side cavity, and an other end located on a side of the inner peripheral side cavity, and
    the rotor core includes a second projecting portion protruding from the inner edge into the respective magnet holder slot and sealing the other end of the second gap.

7. The rotor core of the rotary electric machine of claim 1, wherein
    the rotor core includes a projecting portion extending in the circumferential direction, which protrudes into an opening of the opening end to partially block the opening.

* * * * *